April 28, 1970     O. W. SHIRLEY     3,508,447

GYROSCOPE APPARATUS

Filed Sept. 6, 1967     4 Sheets-Sheet 1

ORIE W. SHIRLEY
INVENTOR

BY
BUCKHORN, BLORE, KLARQUIST & SPARKMAN
ATTORNEYS

April 28, 1970     O. W. SHIRLEY     3,508,447
GYROSCOPE APPARATUS

Filed Sept. 6, 1967     4 Sheets-Sheet 2

April 28, 1970   O. W. SHIRLEY   3,508,447
GYROSCOPE APPARATUS

Filed Sept. 6, 1967   4 Sheets-Sheet 3

ORIE W. SHIRLEY
INVENTOR

BY
BUCKHORN, BLORE, KLARQUIST & SPARKMAN
ATTORNEYS

April 28, 1970  O. W. SHIRLEY  3,508,447
GYROSCOPE APPARATUS
Filed Sept. 6, 1967  4 Sheets-Sheet 4

ORIE W. SHIRLEY
INVENTOR
BY
BUCKHORN, BLORE, KLARQUIST & SPARKMAN
ATTORNEYS

United States Patent Office 3,508,447
Patented Apr. 28, 1970

3,508,447
GYROSCOPE APPARATUS
Orie W. Shirley, Portland, Oreg., assignor to Electronic Specialty Company, Portland, Oreg., a corporation of California
Filed Sept. 6, 1967, Ser. No. 665,756
Int. Cl. G01c 19/26
U.S. Cl. 74—5.1                                                 15 Claims

ABSTRACT OF THE DISCLOSURE

A gyroscope is enclosed in a frame comprising a plurality of longitudinally arranged modular plastic frame members, wherein a first pair of frame members supports the gyroscope's gimbal system. One frame member of the first pair also journals a rotatable caging cam having cam surfaces oriented toward the gyroscope's gimbal system for operating plural cam follower plungers adapted to slide longitudinally through such frame member. These cam follower plungers engage additional cam surfaces on the gimbals for bringing about caging of the same, while another plunger operated by the caging cam is employed for braking the inner gimbal prior to such caging. A further frame member secures the caging cam to the frame and also supports a solenoid adapted for rotating the caging cam. The various frame members are attached to one another by common connecting means extending therethrough.

Background of the invention

Figure 1:
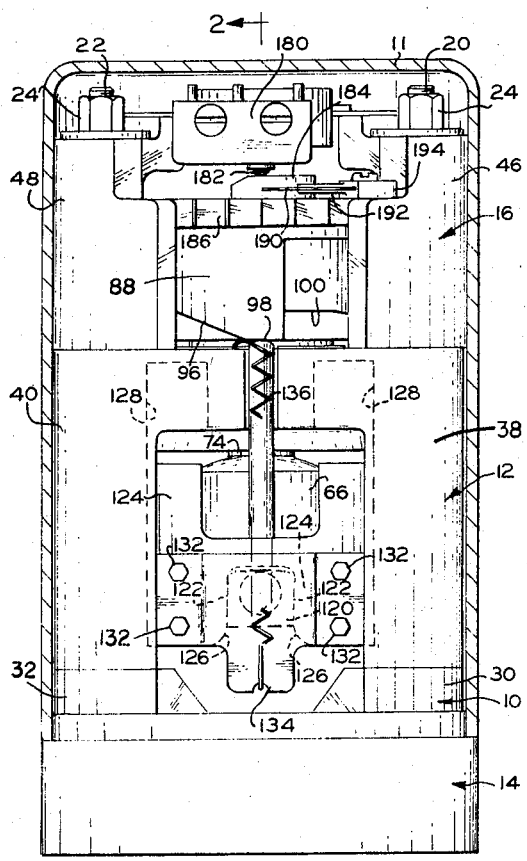

Gyroscope apparatus may be employed for providing a reliable indication and/or control of the attitude or direction of an aircraft in flight. In such an apparatus, caging of the gyroscope is frequently necessary in order to return the axes of the gyroscope to a predetermined orientation relative to the vehicle in which the gyroscope is mounted. Caging is necessary not only to initially position the gyroscope, but also to return the gyroscope to a reference position when, for example, its attitude has changed as the result of drift due to friction, extreme maneuvering of the vehicle, etc. Caging is ordinarily accomplished while the gyroscope's rotor is rotating at high speed.

Gyroscope apparatus including a caging mechanism can take many forms, but the apparatus is usually complex and expensive. Moreover, it will be understood that assembly thereof is frequently an intricate and time-consuming operation, adding not only to the expense of the manufacture, but also adding to the cost of disassembly and repair of the instrument. Furthermore, because of the intricate mechanical complexity involved, the reliability of a gyroscope apparatus may sometimes be less than desired.

Summary of the invention

According to the present invention, a gyroscope apparatus including caging mechanism therefor comprises a plurality of modular frame members, formed of plastic, housing the gyroscope gimbal system and caging mechanism within an easily assembled organization. The modular frame members are disposed in a longitudinal or stacked array with the gimbal system supported between a pair of such frame members. A unitary caging cam is supported upon one of such first pair of frame members, and is secured thereto by a third modular frame member, the latter further including means for rotating the caging cam. Cam follower means extend longitudinally through the frame member which supports the caging cam, the follower means being operated by the caging cam and in turn engaging cam surfaces on the gyroscope gimbal system for bringing about caging of the same. The frame members are secured in their longitudinal or stacked array by common connecting means so that the whole apparatus may be easily assembled and disassembled. According to an embodiment of the present invention, the gimbals and caging cam as well as the frame members are formed of molded plastic, rendering the entire apparatus quite economical to manufacture.

It is accordingly an object of the present invention to provide an improved gyroscope apparatus of economical construction, and one which is easy to assemble.

It is another object of the present invention to provide an improved gyroscope apparatus employing a limited number of economically produced components.

It is a further object of the present invention to provide an improved gyroscope apparatus of modular component construction.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

Drawings

Figure 4:
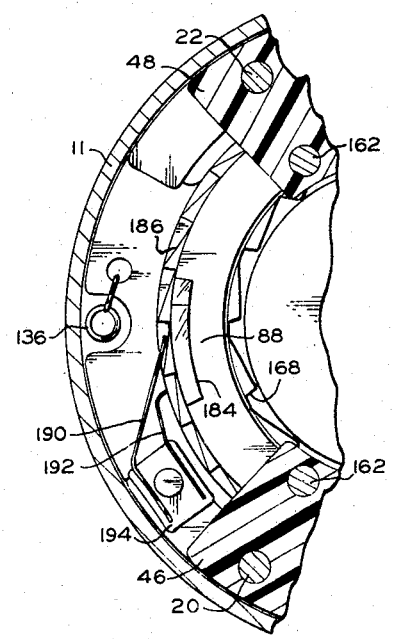
Figure 6:
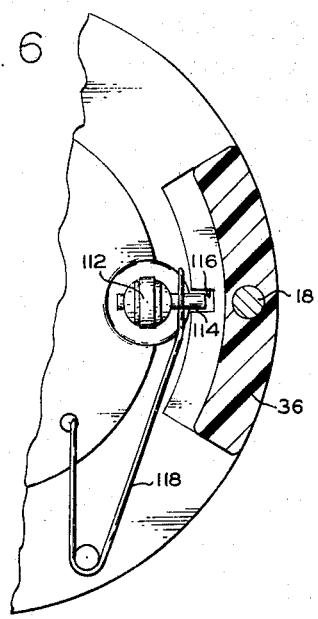
Figure 7:
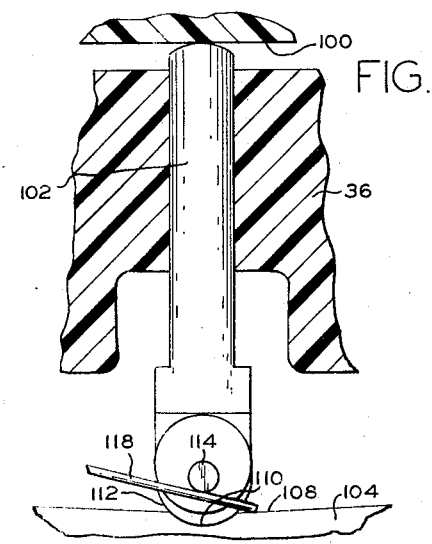
Figure 2:
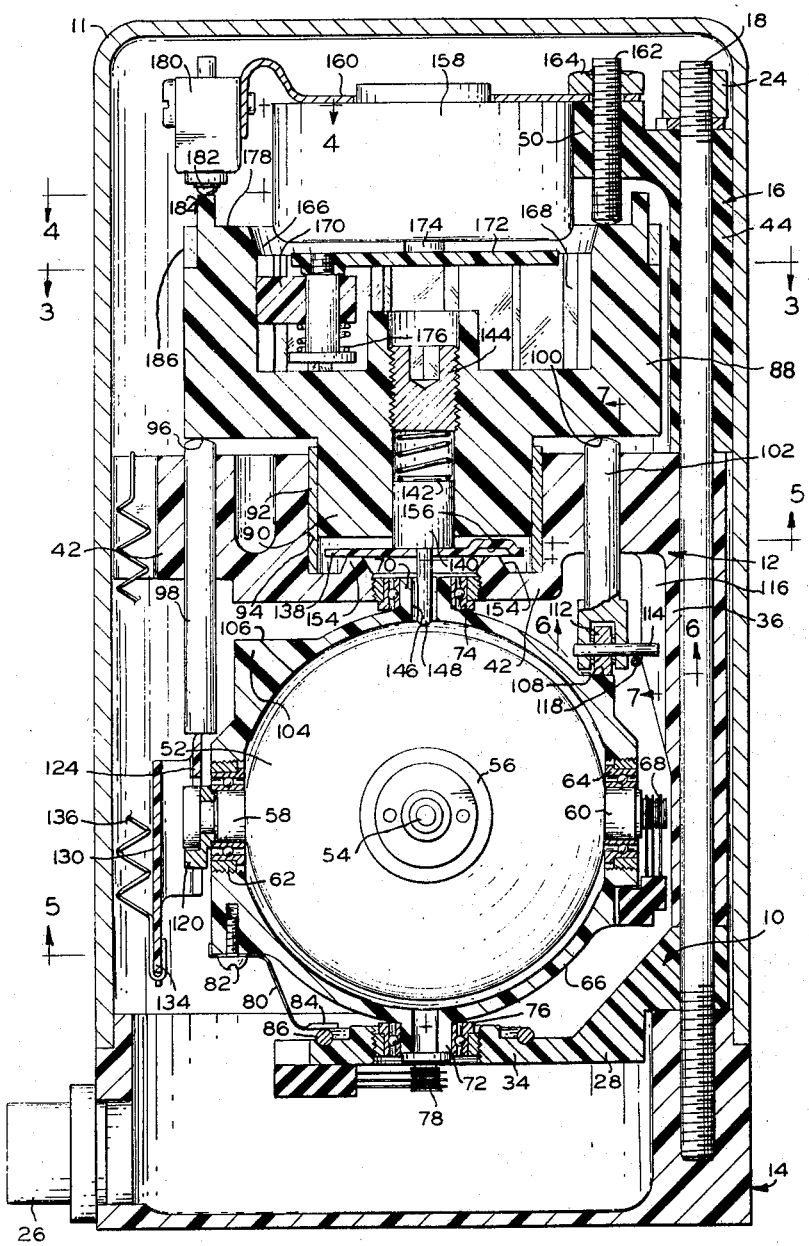
Figure 3:
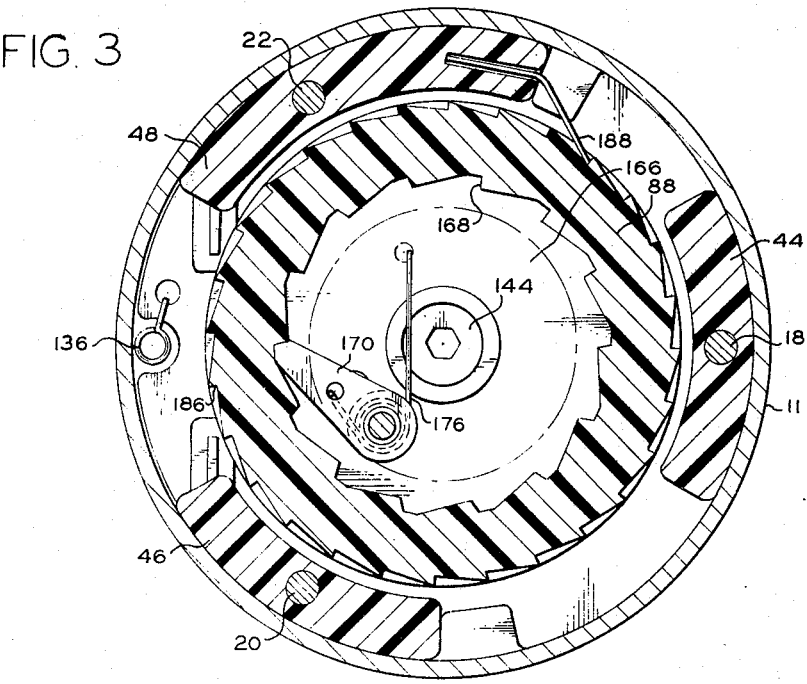
Figure 5:
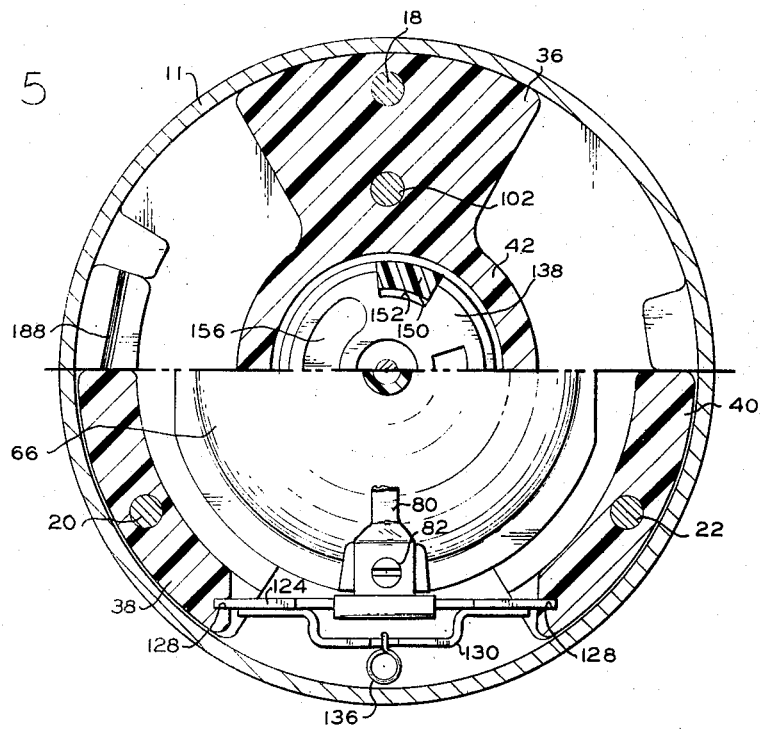
Figure 8:
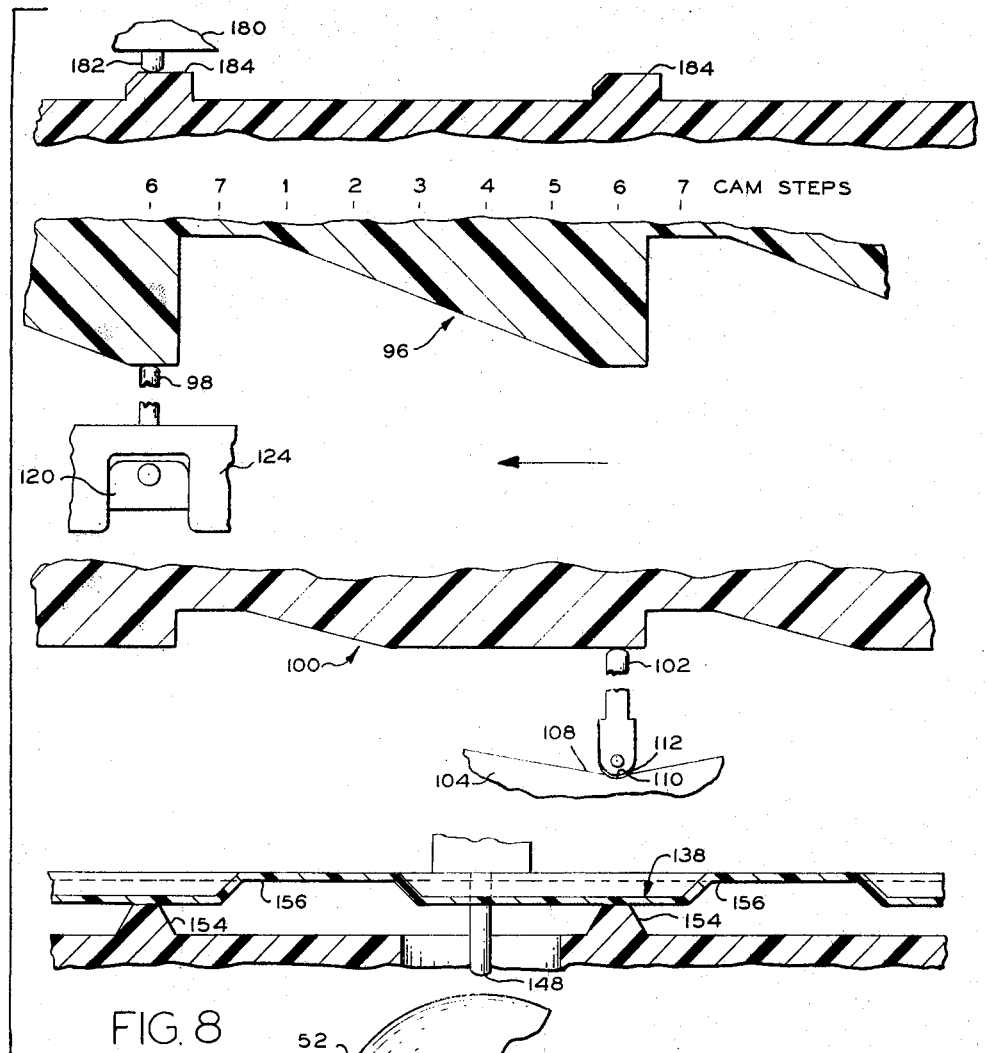
Figure 9:
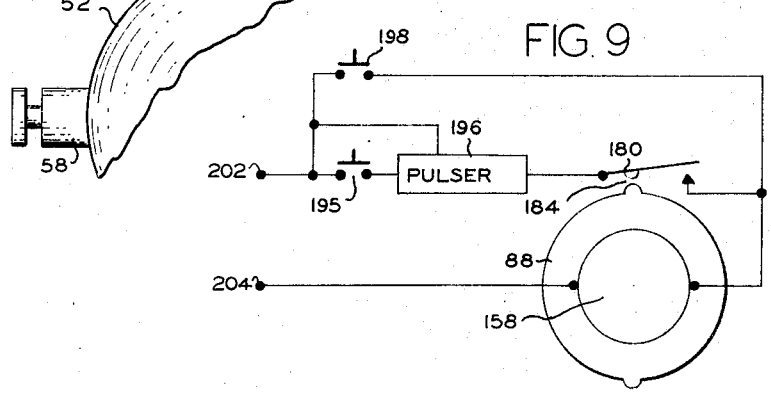

FIG. 1 is a side view, partially in cross section, of gyroscope apparatus according to the present invention;
FIG. 2 is a cross section on an enlarged scale of the gyroscope apparatus taken at 2—2 in FIG. 1;
FIG. 3 is a transverse cross section of the gyroscope apparatus taken at 3—3 in FIG. 2;
FIG. 4 is a partial cross section of the gyroscope apparatus according to the present invention, taken at 4—4 in FIG. 2;
FIG. 5 is another cross section of the gyroscope apparatus according to the present invention taken at 5—5 in FIG. 2 and rotated 90 degrees counterclockwise;
FIG. 6 is another partial cross section of the gyroscope apparatus according to the present invention taken at 6—6 in FIG. 2;
FIG. 7 is a view on a further enlarged scale, partially in cross section, of a cam follower means employed in the apparatus of the present invention, taken at 7—7 in FIG. 2;
FIG. 8 is a coordinated profile development of cam surfaces provided by a caging cam forming a part of the apparatus of the present invention, such profile illustrating the timed sequence of caging operation; and
FIG. 9 is a schematic diagram of means for operating the caging cam of the present invention.

Detailed description

Referring to the drawings, a gyroscope apparatus according to the present invention includes a frame formed of four modular frame members. These comprise a first pair of intermediate frame members numbered 10 and 12, a base member 14, and an upper frame member 16. These frame members are formed of plastic, and in particular are injection molded nylon filled with short fibers of Fiberglas. Each of these members can be molded into final shape without requiring machining since the aforementioned material has excellent mechanical strength and dimensional stability.

The modular frame members ar earranged in longitudinal or stacked array and are connected together in interfitting relation by means of three longitudinally extending studs 18, 20, and 22. The studs are threaded at each end and between the threaded portions pass through mating bores in the frame members. The threaded bottm the quick borwnf ox jumps over the lazy black dog m tomtom portion of each stud is received in a threaded tap in base frame member 14, while the threaded portion at top of each of the studs receives a nut 24 which is tightened to secure the frame together. The apparatus is suitably provided with a metal cover, 11, enclosing the plastic frame members.

In the present embodiment, the base frame member 14 is substantially uniform in cross section throughout 360 degrees except principally for a connector 26, while the other frame members are each suitably constructed in the form of three arcuate-shaped plastic legs joined by a central web, each leg being adapted to receive one of the aforementioned studs 18, 20, or 22. For example, first intermediate frame member 10 is formed of three cylindrical segments 28, 30, and 32 joined at lower central web 34. Similarly, second intermediate frame member 12 comprises three cylindrical segments 36, 38, and 40, joined at upper central web 42, and substantially matching the segments of frame member 10. Likewise, upper frame member 16 includes cylindrical segments 44, 46, and 48 joined at central web 50.

Intermediate frame members 10 and 12 are located on either longitudinal side of the gyroscope gimbal system for supporting the same. The construction is best seen in FIG. 2, which is a cross section of the apparatus according to the present invention, excluding inner gimbal 52 which is shown in elevation. This gimbal system comprises an inner spherical gimbal 52 composed of two semispheres which are joined in the plane of the drawing in FIG. 2. These semispheres are also suitably formed of injections molded nylon filled with short fibers of fiberglass. Inner gimbal 52 supports the axis 54 of a gyroscope rotor (not shown) mounted inside the inner gimbal 52 upon bearing mounts 56. The gyroscope rotor is conveniently the rotor of an AC motor, the stator of which is also carried in the inner gimbal. Thus, axis 54 is the spin axis of the gyroscope rotor and is perpendicular to the plane of FIG. 2 in the position shown, which is the caged position for the gyroscope.

Inner gimbal 52 includes a pair of trunnions 58 and 60 defining the axis of rotation of the inner gimbal, which axis is perpendicular to axis 54. Trunnions 58 and 60 are journaled respectively in bearings 62 and 64 mounted in outer gimbal 66 as illustrated in cross section in FIG. 2, and these bearings may be employed to hold the semispherical parts of the inner gimbal together. Trunnion 60 also carries slip ring assembly 68 employed for making connection between the outer gimbal and the inner gimbal, and to the motor operating the gyroscope rotor.

Outer gimbal 66 is also formed of two semipheres which are suitably formed of injection molded nylon filled with short fibers of fiberglass, and which are joined in a plane perpendicular to the drawing of FIG. 2, passing through the axis of the outer gimbal as defined by trunnions 70 and 72. Trunnion 70 is journaled in a bearing 74 received in central web portion 42 of second intermediate frame member 12. Similarly, trunnion 72 is journaled in bearing 76 received in central web 34 of first intermediate frame member 10. These bearings position the rotatable axis of outer gimbal 66 substantially perpendicularly to the axis of inner gimbal 52, and may be employed to hold together the semispherical parts of the outer gimbal. A slip ring assembly 78 is employed in a customary manner to convey power from a source of power outside the gyroscope apparatus to the slip ring assembly 68 hereinbefore described for energizing the gyroscope rotor motor.

The outer gimbal 66 also carries a potentiometer mechanism comprising a wiper arm 80 secured to the outer periphery of the outer gimbal by screw 82. Wiper arm 80 includes a contact portion 84 for making slidable connection with an annular resistance member 86, mounted on plastic central web 34 of the first intermediate frame member 10. Both the wiper arm and the annular member 86 are connected by means, not shown, for indicating the position of the outer gimbal whereby such information may be used to detect the position of a vehicle in flight, or control the position of the vehicle. If the gyroscope apparatus is mounted vertically, an electric signal from the potentiometer can be employed to indicate the azimuth or heading of the vehicle relative to the gyroscope. The angular rotation of the inner gimbal is suitably restrained by stops (not shown) so that it may rotate on bearings 62 and 64 on either side of the position illustrated, only to the extent required during normal flight.

A gyroscope of this type must be provided with an arrangement for caging the gyroscope, i.e., bringing its spin axis into a predetermined relationship with respect to the frame supporting the outer gimbal. This requires bringing both the outer gimbal and the inner gimbal into predetermined angular positions relative to such frame. It is desirable to be able to do this while the gyroscope is operating, i.e., while its rotor is spinning at high speeds.

For this purpose of caging the gyroscope, the apparatus according to the present invention is provided with a cylindrical caging cam 88 having a lower perpendicular boss 90 so journaled for rotation in liner 92 disposed in a cylindrical recess 94 of intermediate frame member 12, and specifically in central web 42 thereof. Cam 88 is then journaled for rotation on an axis substantially longitudinal of the frame and substantially coinciding with the axis of the outer gimbal as defined by bearings 74 and 76. Cam 88 is also suitably formed of injection molded nylon filled with short fibers of Fiberglas.

The caging cam 88 is provided with a plurality of lateral cam faces outside the diameter of boss 90. These cam faces are lateral in the sense of being transverse to the longitudinal axis of the frame and the outer gimbal supported by the same. A first cam face is disposed around the periphery of the lower surface of cam 88 and specifically at 96 so as to engage metal cam follower plunger 98 extending longitudinally in slidable relation through a bore in intermediate frame member 12. This cam face extends in an arc about the axis of the caging cam so that it will remain aligned with cam follower plunger 98 at different rotatable positions of cam 88. Cam 88 is also provided with a second lateral or transverse cam face, 100, disposed so as to engage metal cam follower plunger 102. This cam face 100 is also arcuate in shape and concentrically inside cam face 96 whereby cam face 100 will engage longitudinally slidable cam follower plunger 102 in various rotatable positions of cam 88. The profiles of cam faces 96 and 100 are expanded in developmental fashion in FIG. 8. It should be noted that the contour in each cam face, 96, and 100, is repeated twice around caging cam 88, such that a complete caging operation may take place for only 180 degrees of rotation of caging cam 88.

Outer gimbal 66 includes an upraised portion 104 around its upper periphery for providing a cam surface for the outer gimbal extending in a circle about the axis of the outer gimbal. This cam surface presents a lateral or transverse face opposite the lateral or transverse faces 96 and 100 of caging cam 88. Except for the variations in contour and profile, the cam faces on outer gimbal 66 and on caging cam 88 are substantially parallel and, in any case, are parallel in cross section, such cross section being taken longitudinally through the apparatus.

The profile of the cam face provided by upraised portion 104 on the outer gimbal has the operational characteristics of a heart-shaped edge cam, that is, it has a crest 106 at one point in its circumference, and a low point, 108, at a location 180 degrees removed therefrom. At the latter point, such cam face is provided with a notch 110, most clearly seen in FIG. 7. Cam follower plunger 102 is provided with a roller 112 at the lower end thereof adapted to roll on the cam face on upraised portion 104 and to be received in notch 110. Roller 112 is journaled on pin 114 extending through a forked lower end of cam follower plunger 102, and also extending into a vertical slot 116 in intermediate frame member 12 so that roller 112 is held in a position to properly engage the cam face. That is, the axis of roller 112 is directed so that, if extended, it would intersect the axis of outer gimbal 66. Cam follower plunger 102 is urged upwardly against cam face 100 by spring 118 positioned under the aforementioned pin 114.

Trunnion 58 of inner gimbal 52 is provided with an edge cam 120 secured to the end thereof so that such cam rotates with the inner gimbal. The edge shape of edge cam 120 is such as to provide an edge face curved convexly upwards, or toward cam follower plunger 98. The convexly curved surface portion is lateral in the sense of being transverse to the longitudinal axis of the gyroscope apparatus toward plunger 98, and terminates in side edges 122 which are parallel to one another and substantially longitudinal of the apparatus. The edge cam 120 is engageable with a metal bifurcated member 124 having parallel inside edges adapted to engage the side edges 122 of the edge cam, as bifurcated member 124 is urged downwardly by cam follower plunger 98. Bifurcated member 124 is flared outwardly at its lower edges 126 so that it may more easily engage cam 120 when moved downwardly towards the same.

Bifurcated member 124 is received in vertical edge slots 128 provided in cylindrical segments 38 and 40 of intermediate frame member 12. Bifurcated member 124 is further provided with a metal outer frame 130 secured to the bifurcated member by means of fasteners 132 and having a downwardly extending tab 134 notched to receive a spring 136. The upper end of spring 136 is connected to the upper portion of intermediate frame member 12 and acts to urge bifurcated member 124 upwards against cam follower plunger 98. Cam follower plunger 98 is, in turn, urged against cam face 96 of caging cam 88.

A circular plate 138 having a diameter of less than that of liner 92 is concentrically disposed with respect to the axis of caging cam 88 underneath boss 90. Plate 138 is mounted upon cylindrical member 140 which is slidably received within a central bore in caging cam 88 and urged downwardly by means of a central spring 142, the latter being held in place with a threaded insert 144. Trunning 70 of the outer gimbal is provided with a central aperture 146, and a plunger 148, attached to plate 138 as well as cylindrical member 140, extends through such aperture so that it may reach and contact the spherical surface of inner gimbal 52. Plate 138 is rotatable with the caging cam 88, but is free for only limited longitudinal movement. Projections 150 extending downwardly from boss 90 engage notches 152 in plate 138 so that, regardless of the vertical position of plate 138, plate 138 is rotated with caging cam 88.

Central web 42 of intermediate frame member 12 is provided with upper projections 154 adapted to be received in upwardly-formed recesses 156 in plate 138. As further illustrated in the development of FIG. 8, the recesses 156 cooperate with projections 154 whereby operation of plunger 148 is synchronized with the rotation and camming action of caging cam 88. Thus, when projections 154 engage recesses 156, spring 142 forces plunger 148 onto the outer spherical surface of inner gimbal 52, thus locking the same against rotation. However, when plate 138 is rotated by caging cam 88 such that projections 154 do not fall within recesses 156, then plunger 148 is upraised from the outer surface of inner gimbal 52. It should be noted that there are two matching projections 154, and recesses 156, located around the circumference of plate 138 at diametrically opposite locations from one another.

The caging cam is rotated by means of a rotating device mounted upon upper frame member 16. This rotating device preferably comprises a rotary solenoid or stepping motor 158 attached to plate 160 which is, in turn, joined to central web 50 by means of three studs 162 threadably received in web 50, with nuts 164 securing the plate 160 onto the web. The rotary solenoid 158 is located within a central aperture in web 50, and depends downwardly into a central recess 166 in the upper portion of caging cam 88. The inside wall of recess 166 is formed with ratchet teeth 168 which are adapted to be engaged by a pawl 170 attached to a plate 172 carried by shaft 174 of solenoid 158. There are fourteen ratchet teeth 168 around the inside of recess 166, and rotary solenoid 158 is adapted to move cam 88 by one-fourteenth of a complete revolution each time the rotary solenoid is energized. Each time the rotary solenoid is deenergized, plate 172 returns pawl 170 to a position for engaging the next tooth, with pawl 170 being urged against the teeth by means of spring 176. Engagement of seven successive teeth by pawl 170 is sufficient to rotate caging cam 88 through the 180 degrees or a complete camming cycle, the camming surfaces of cam 88 being repeated twice in 360 degrees. The camming cycle is divided into cam steps 1 through 7, in the development of FIG. 8, each step representing the movement of cam 88 by one ratchet tooth by rotary solenoid 158.

Around the outer periphery of caging cam 88, there is formed a further plurality of ratchet teeth 186 engageable by the spring pawl 188 for preventing reverse rotation of the cam. Spring pawl 188 is suitably mounted in cylindrical segment 48 of upper frame member 16.

Studs 162, in addition to securing plate 160 to central web 50 of upper frame member 44, also bear upon an upper edge 178 of caging cam 88 whereby to hold cam 88 between frame members 12 and 16. Spring 142, within cam 88, tends to force caging cam 88 upward against studs 162 with the studs 162 thereby regulating the correct longitudinal position of caging cam 88.

Plate 160 also supports a switch 180 having an operator 182 for engagement with one of two upper cam portions 184 disposed at the top edge of cam 88. Each cam portion 184 extends upwardly to provide a lateral cam surface to correspond with the cam step 6, in the sequence according to FIG. 8, thereby indicating when cam step 6 has been reached. Referring to the schematic electrical diagram of FIG. 9, switch 180 is disposed in a circuit for energizing rotary solenoid 158. As will hereinafter be indicated, initiation of the operation of rotary solenoid 158 steps cam 88 through a complete cycle until cam step 6 is reached, at which time switch 180 disconnects the rotary solenoid.

A further switch may be employed in a circuit for indicating whether the caging cam is in a gyrosecope caging position or in a position in which the gyroscope is uncaged. This switch comprises first and second contacts 190 and 192 respectively secured by an insulating member 194 joined to cylindrical segment 46 of frame member 16. The contact 190 is adapted to engage the side of cam portion 184 in the sixth cam step, whereby also to indicate when cam 88 has reached this step. The contacts 190 and 192 may be connected to a suitable indicating circuit (not shown).

The caging operation of the gyroscope apparatus according to the present invention will be described with the aid of development cam profile of FIG. 8, and the schematic diagram of FIG. 9. In the seven consecutive cam steps indicated in FIG. 8, cam step 7 is the uncaged or free position of the gyroscope wherein the gimbals are free to move on their axes so that the gyroscope rotor is substantially free to maintain its position in space while the vehicle may move relative thereto. The cam step positions 1 through 6 indicate a caging sequence initiated by closure of switch 195. (See FIG. 9.) Closure of switch 195 connects a pulser or flasher 196 in series with the contacts of switch 180 and solenoid 158. Solenoid 158 is thereby energized via flasher 196 from a source of power provided at terminals 202 and 204. Pulser or flasher 196 continues to provide pulses to operate solenoid 158 as long as switch 180 remains closed. As indicated hereinbefore, the solenoid 158 will move the cam 88 to cam step 6 whereupon switch 180 disconnects the solenoid and flasher 196. Each cam steps represents the distance the cam 88 is moved by one clockwise movement of pawl 170. Since there are seven ratchet teeth 168 within 180 degrees of rotation, each cam step comprises one-seventh of 180 degrees. The movement of the cam faces relative to cam follower means is indicated by the arrow in FIG. 8.

An attempt to cage the gyroscope by merely forcing the rotational movement of either one of the two gimbals about its bearing axis into a desired position while the gryoscope rotor is rotating at high speed will be resisted by strong forces which result from precession of the spinning gyroscope rotor, unless the spin axis of the gyroscope rotor happens to be in alignment with such rotational movement. The precision of the rotor is an angular movement of the rotor about a third axis which, in this case, will be the bearing axis of the remaining gimbal. The angular movement or precession will be in a direction tending to bring the spin axis of the rotor into coincidence with the rotational movement referred to above, not only as to the direction of the axes, but also as to direcion of rotation. However, if such precession of the rotor is prevented, then the resisting force is not produced and a gimbal can be easily rotated to its caged position. In the apparatus of the present invention, the first caging operation comprises the braking of the inner gimbal to prevent precession of the rotor while the outer gimbal is being caged.

Referring again to the drawings, and particularly to FIG. 8, movement of the caging cam 88 from step 7, or the uncaged position, to step 1 of the caging sequence, aligns recesses 156 with upper projections 154 of intermediate frame member 12. Therefore, plate 138 is allowed to move vertically downward and bring plunger 148 into contact with the spherical outer surface of inner gimbal 52. This brakes the inner gimbal and destroys the gyroscopic rigidity of the device so that the outer gimbal may be caged.

Proceeding with the caging sequence and again considering cam step 1, lateral cam face 100 engages cam follower plunger 102 and starts moving roller 112 downwardly against the lateral cam face on the upraised portion 104 of outer gimbal 66. The profile of this cam face has the operational characteristics of a heart-shaped edge cam and additionally includes a notch 110 at the low point thereof. Continued movement of cam 88 will rotate outer gimbal 66 around the longitudinal axis of bearings 74 and 76 until roller 112 engages notch 110 at approximately cam step 3. The rotational movement of the outer gimbal is not prevented by the engagement of plunger 148 with the spherical surface of inner gimbal 52, since plunger 148 is in alignment with the axis of rotational movement of the outer gimbal. When roller 112 engages notch 110, the outer gimbal is in caged position. At this time bearings 62 and 64, in which trunnions 58 and 60 of the inner gimbal are journaled, will be in the position illustrated in FIGS. 1 and 2, that is, with the edge cam 120 extending in substantial alignment under bifurcated member 124. Lateral cam face 96 engaging cam follower plunger 98, urges cam follower plunger 98 downwardly, with continued rotation of cam 88, so that bifurcated member 124 can engage edge cam 120 for also rotating the inner gimbal into caged position. Just before bifurcated member 124 engages cam 120, movement of plate 138 raises plunger 148 releasing the inner gimbal for rotation. Since the outer gimbal is held in caged position at this time, the inner gimbal can be rotated into caged position without encountering forces resulting from precession of the gyroscope rotor. Continued movement of the caging cam to step 6 moves bifurcated member 124 into substantially complete engagement with edge cam 120 as illustrated, for example, in FIGS. 1 and 2. In this position, bifurcated member 124 is not only effective to cage the inner gimbal, but also more accurately cages the outer gimbal, completely locking the outer gimbal so the same cannot rotate about its longitudinal axis.

It is noted that since the inner gimbal has limited rotational movement, the bifurcated member 124 is capable of engaging the top and sides of edge cam 120 whereby to rotate the inner gimbal into the caged position. The edge cam 120 is not permitted rotation into a position wherein such engagement could not take place.

To uncage the gyroscope, switch 198 is depressed and a circuit is completed therethrough to rotary solenoid 158 for stepping the caging cam to cam step 7. In this position, cam follower plungers 98 and 102 are moved upwardly by springs 136 and 118 against the upwardmost portion of cam faces 96 and 100 so as to free the gyroscope rotor for movement relative to the frame. As noted, the brake plunger 148 has previously been released. The gyroscope rotor will seek to maintain the position established therefor during the caging operation.

Since the major portions of the gyroscope apparatus according to the present invention are formed of molded plastic, manufacture of the apparatus is rendered quite economical. No machining is needed to manufacture the frame members 10, 12, 14, and 16, caging cam 88, or the inner and outer gimbals 52 and 66.

The apparatus is also easily assembled starting with the assembly of the gimbal system. The two semispheres comprising the inner gimbal are assembled around the gyroscope rotor and stator, and the outer gimbal is provided with bearings and similarly assembled in supporting relation to the inner gimbal. Intermediate frame member 10 is supplied with a bearing 76, and is placed in interfitting relation upon the base frame member 14. Trunnion 72 of outer gimbal 66 is then inserted in bearing 76. Second intermediate frame member 12 is similarly provided with bearing 74 and liner 92, and cam follower means 98 and 102 as well as bifurcated member 124 are inserted upwardly in the intermediate frame member 12. The frame member 12 is now placed longitudinally in interfitting relation upon intermediate frame member 10 with trunnion 70 inserted into bearing 74. This placement of frame member 12 holds the gimbals and the cam follower plungers in proper relation. Then the plate 138 mechanism and caging cam 88 are located within liner 92 so that plunger 148 extends through the aperture in trunnion 70. Now, the upper frame member 16, including solenoid 158 and switch 180 carried thereby, is placed longitudinally upon intermediate frame member 12. Studs 18 are extended longitudinally through the frame members for securing the same together and can be conveniently employed for maintaining the various frame members in alignment during assembly of the apparatus. Also studs 162 are adjusted to correctly position the caging cam 88, and it will be understood that wiring and spring connections and the like will be made during assembly of the apparatus. The stacked longitudinal arrangement employing the modular construction according to the present invention, and the operational movement of moving parts such as cam follower means in the same longitudinal direction, brings about the desired ease of assembly. Furthermore, the number of elements, as well as the complexity thereof, is reduced and simplified as compared with the prior art in the construction according to the present invention.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. A gyroscope apparatus comprising:
   a system of gimbals for supporting a gyroscope rotor, said system including an inner gimbal rotatably supporting said rotor upon a first axis and an outer gimbal rotatably supporting said inner gimbal on a second axis.
   a frame for said gyroscope apparatus comprising a plurality of modular frame members arranged longitudinally to form said frame and including a first pair of frame members located longitudinally on either side of said outer gimbal for rotatably supporting said outer gimbal on a third axis perpendicular to said second axis.
   a caging cam member rotatable about an axis longitudinal of said frame and supported by at least one of said modular frame members, said caging cam member having a plurality of cam surfaces,
   a plurality of cam follower means for engaging the cam surfaces of said caging cam member, each of said cam follower means being positioned for longitudinal movement with respect to said frame under the control of said caging cam member,
   means providing a cam surface for said outer gimbal engageable by a first of said cam follower means for selectively rotating said outer gimbal into a caged position, and
   means providing a cam surface for said inner gimbal engageable by a second of said second cam follower means for selectively rotating said inner gimbal into a caged position.

2. The apparatus according to claim 1 wherein said outer gimbal is supported between bearing means located respectively on said first pair of frame members for positioning said third axis substantially longitudinally of said frame,
   the said means providing a cam surface for said outer gimbal including a lateral cam face on said outer gimbal located on said outer gimbal in a circle about said third axis, such lateral cam face having a profile with high and low points and receiving the first of said cam follower means for caging said outer gimbal when said first of said cam follower means is farthest extended toward said lateral cam face on said outer gimbal,
   said means providing a cam surface for said inner gimbal including a cam member joined to the axis of said inner gimbal at one end thereof for rotation therewith, such inner gimbal cam member being provided with a lateral cam face and which is adapted to be urged into caged position by the second of said cam follower means.

3. The apparauts according to claim 2 wherein the cam surfaces of said caging cam mmeber comprise a pair of lateral cam faces disposed in concentric arcs about the axis of said caging cam member, said cam surfaces of said caging cam member substantially facing the lateral cam face on said outer gimbal and said lateral cam face of said inner gimbal cam member, the first and second of said cam follower means comprising longitudinal plungers extending between the cam surfaces of said caging cam member and the cam faces of said outer gimbal and said inner gimbal.

4. The apparatus according to claim 1 including at least a third frame member positioned at one longitudinal end of said first pair of frame members, said caging cam member being journaled for rotaion between one of said first pair of frame members and said third frame member, said cam follower means being slidably supported for longitudinal movement through said one of said first pair of frame members, and connecting means for securing said frame members together in interfitting relation.

5. The apparatus according to claim 4 further including means mounted on said third frame member for selectively rotating said caging cam member about its axis.

6. The apparatus according to claim 4 wherein said caging cam member is provided with circumferential ratchet teeth employed for rotaing said caging cam about its longitudinal axis, and
   a stepping solenoid mounted on the third frame member adjacent said cam member and provided with a pawl for engaging said ratchet teeth to rotate said cam member when said solenoid is energized.

7. The apparatus according to claim 6 further including a fourth frame member located on the longitudinally opposite end of said first pair of frame members from said third frame member, said fourth frame member also being secured to the other frame members by said connecting means,
   said fourth frame member forming a base of said apparatus.

8. The apparatus according to claim 1 wherein said frame members are formed of injection molded nylon containing Fiberglas.

9. The apparatus according to claim 8 wherein said caging cam member and said gimbals are also formed of injection molded nylon containing Fiberglas,
   said gimbals each comprising a pair of semishperes joined along a plane including the axis of such gimbal.

10. The apparatus according to claim 4 wherein said frame members are provided with matching circumferentially spaced bores, and wherein said connecting means comprise through studs received in said bores for securing said frame members together.

11. The apparatus according to any of the previous claims further including braking means operated by said caging cam member and positioned for longitudinal movement with respect to said frame for selectively engaging an outer portion of said inner gimbal.

12. The apparatus according to claim 11 wherein said braking means includes a plate rotatable with said caging cam member about the axis thereof but free from limited longitudinal movement, said plate carrying a third plunger for contacting an outer portion of said inner gimbal,
   said outer gimbal including trunnions mounted on bearings carried respectively by said first pair of frame members, said third plunger extending axially through a bearing and trunnion of said outer gimbal for reaching said inner gimbal.

13. The apparatus according to claim 2 wherein said inner gimbal cam member comprises a cam joined to the axis of said inner gimbal, an edge face of said cam providing a cam surface having a portion curved convexly towards the second of said cam follower means, said curved surface portion terminating in side edges parallel to one another on either side of the axis of said inner gimbal,
   said second of said follower means including a bifurcated member having parallel inside edges adapted to engage the parallel side edges of said cam in the caged position of said inner gimbal, the outer gimbal when caged being rotationally positioned to align the axis of said inner gimbal with the second of said cam follower means so that longitudinal movement of said second of said cam follower means toward said cam will engage said cam and cage said inner gimbal.

14. The apparatus according to claim 6 wherein said apparatus is provided with a switch mounted on said third frame member,
   said caging cam member including an additional cam surface for engaging said switch in a predetermined rotational location of said caging cam member, means for connecting said solenoid to a source of power for rotationally stepping said caging cam member to produce caging of said outer gimbal and said inner gimbal, and circuit means connecting said switch to disconnect said solenoid when the caging cam member is in a position caging both said gimbals.

15. The apparatus according to claim 11 wherein the cam surfaces of said caging cam member are configured to operate said cam follower means to cage the said outer gimbal and the said inner gimbal in that order after braking of said inner gimbal by said braking means, said caging cam member being effective to disengage said braking means from said inner gimbal after caging of said outer gimbal and before caging said inner gimbal.

References Cited

UNITED STATES PATENTS

| | | | |
|---|---|---|---|
| 2,722,124 | 11/1955 | Smith | 74—5.1 |
| 2,729,978 | 1/1956 | Judson | 74—5.1 |
| 2,799,169 | 7/1957 | Welti | 74—5.1 |
| 2,842,967 | 1/1958 | Borden et al. | 74—5.1 |
| 2,919,586 | 1/1960 | Adkins | 74—5.1 XR |
| 2,962,901 | 12/1960 | Shirley | 74—5.1 |
| 2,982,138 | 5/1961 | Lyman | 74—5.1 |
| 3,046,796 | 7/1962 | Thierman | 74—5.1 |

FRED C. MATTERN, Jr., Primary Examiner

M. ANTONAKAS, Assistant Examiner

PO-1050
(5/69)

UNITED STATES PATENT OFFICE
CERTIFICATE OF CORRECTION

Patent No. 3,508,447                     Dated  April 28, 1970

Inventor(s)      Orie W. Shirley

It is certified that error appears in the above-identified patent and that said Letters Patent are hereby corrected as shown below:

Column 2, line 69, change "ar earranged" to --are arranged--.
Column 3, lines 3, 4 and 5, change "m the quick borwnf ox jumps over the lazy black dog m tomtom" to --tom--.  Column 4, line 27, after "90" cancel --so--.  Column 5, line 49, change "Trunning" to --Trunnion--.  Column 6, line 55, after "is" cancel --un--.
Column 6, line 66, change "development" to --developmental--.
Column 7, line 22, change "precision" to --precession--.
Column 9, line 58, change "mmeber" to --member.  Column 9, line 71, change "rotaion" to --rotation--.  Column 10, line 8, change "rotaing" to --rotating--.  Column 12, line 6, change "1/1958" to --7/1958--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents